United States Patent [19]

Loos

[11] 4,454,769
[45] Jun. 19, 1984

[54] RADIAL FORCE MEASURING CELL

[75] Inventor: Horst-Rudolf Loos, Villars-sur-Glâne, Switzerland

[73] Assignee: Vibro-Meter SA, Fribourg, Switzerland

[21] Appl. No.: 338,245

[22] Filed: Jan. 11, 1982

[30] Foreign Application Priority Data

Feb. 26, 1981 [EP] European Pat. Off. ........ 81810063.8

[51] Int. Cl.³ ........................... G01L 5/16; G01L 1/22
[52] U.S. Cl. ................................ 73/862.04; 73/862.65; 73/862.67
[58] Field of Search ............ 73/765, 781, 189, 862.04, 73/862.05, 862.06, 862.48, 862.54, 862.66, 862.67, 862.56, 862.65

[56] References Cited

U.S. PATENT DOCUMENTS 3,695,096 10/1972 Kutsay ........................ 73/862.66 X
3,853,001 12/1974 Mock ............................... 73/862.56
3,949,603 4/1976 Laimins ........................... 73/862.66

FOREIGN PATENT DOCUMENTS 2802947 7/1978 Fed. Rep. of Germany ... 73/862.56
2009943 12/1978 United Kingdom .
1577341 10/1980 United Kingdom ............ 73/862.67

Primary Examiner—Charles A. Ruehl
Attorney, Agent, or Firm—Wender, Murase & White

[57] ABSTRACT

The measuring cell comprises two systems of transducers (strain gauges) disposed respectively in two regions of concentration of force of the cell, each system comprising a pair of transducers arranged axially within a plane, the angle enclosed between the plane of the first pair and the plane of the second pair being of 60°. This permits the suppression of the third harmonic in the output signal delivered by a bridge in which the transducers are connected. The opposite arms of the bridge comprise, respectively, a transducer of the first and a transducer of the second pair, the transducers of the first pair and the transducers of the second pair being arranged in the cell symetrically with respect to the axis of the cell.

10 Claims, 30 Drawing Figures

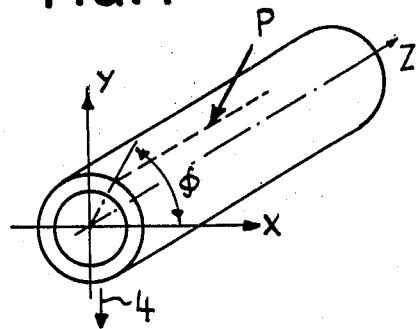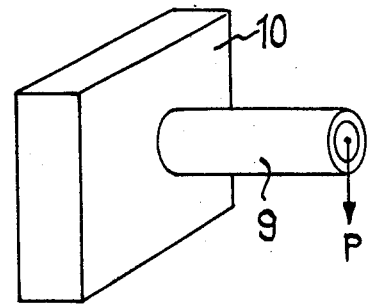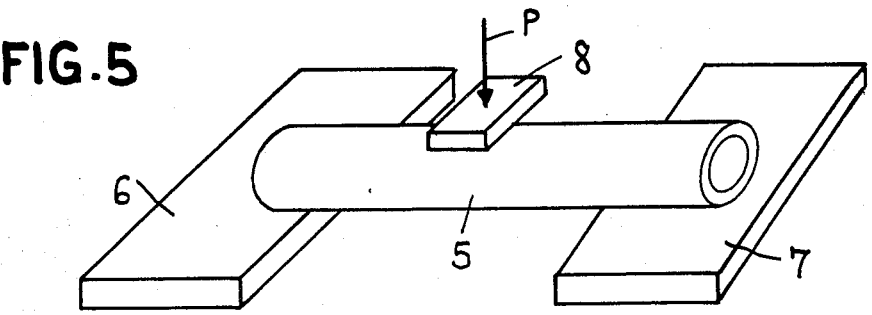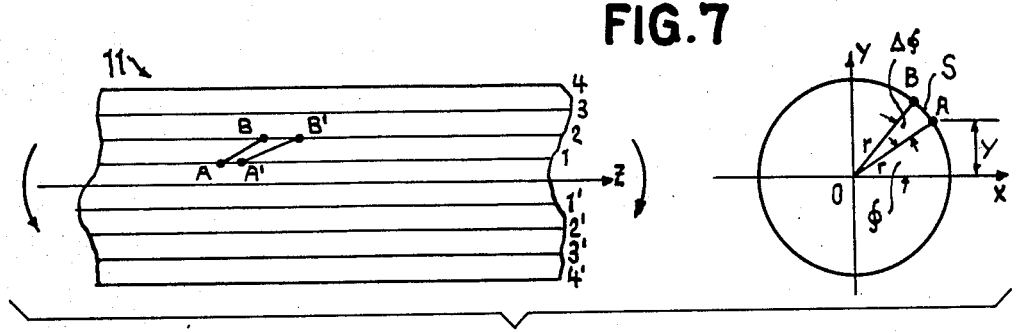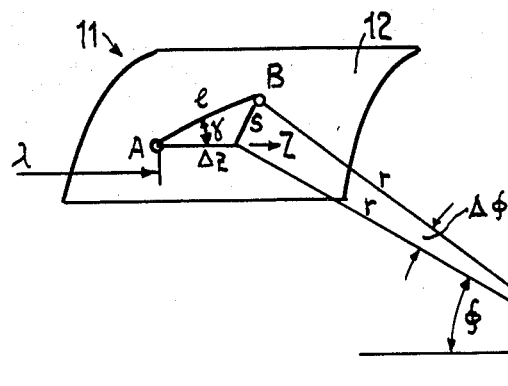

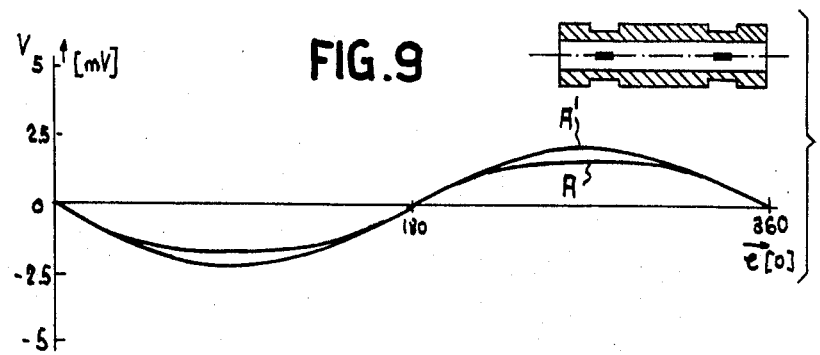
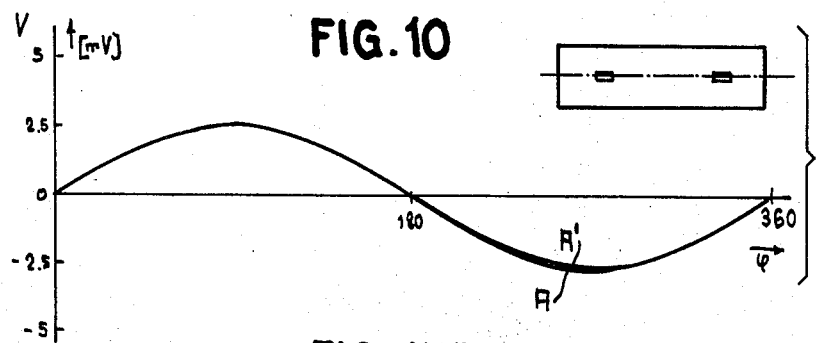
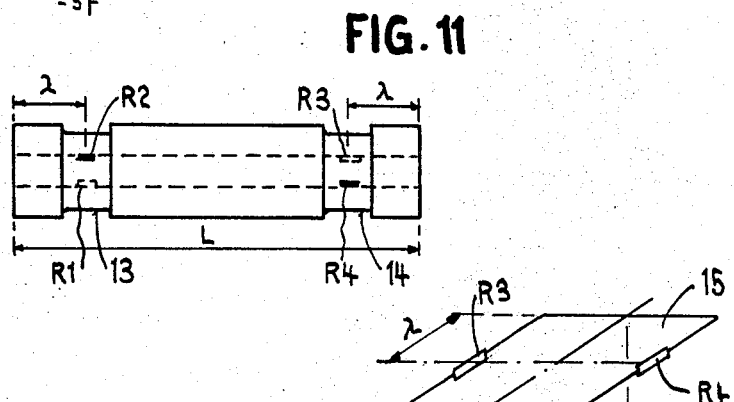
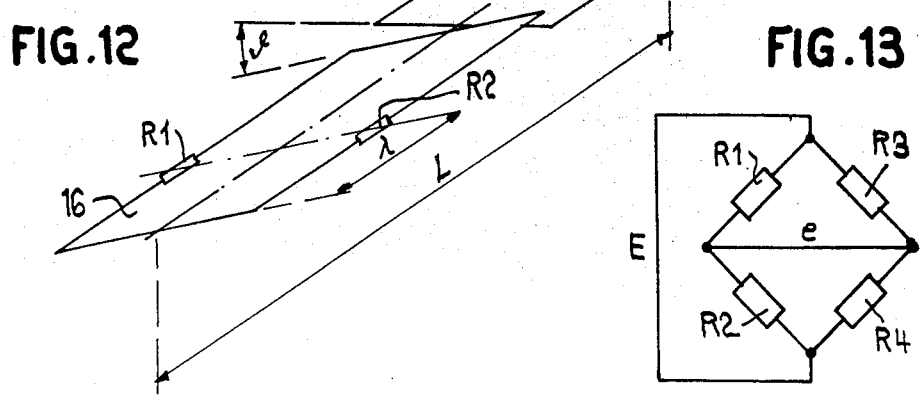

FIG. 21
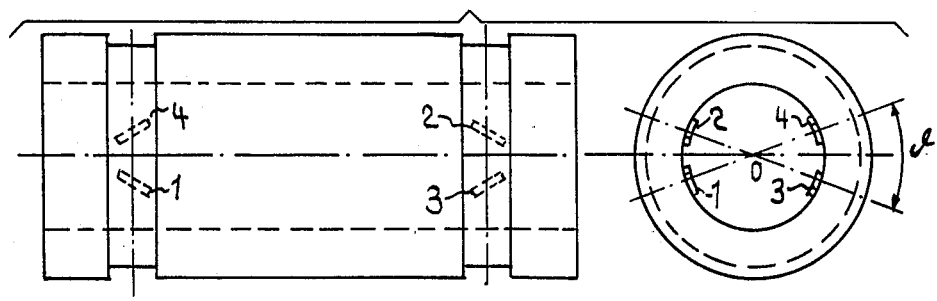
FIG. 23
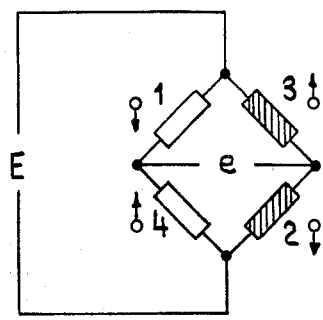
FIG. 24
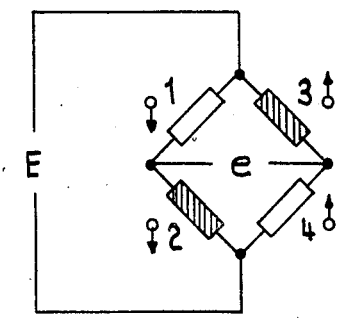
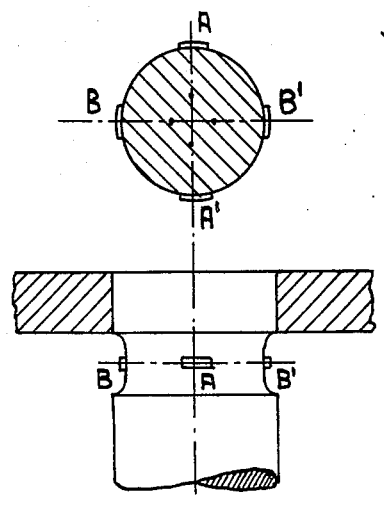
FIG. 25

RADIAL FORCE MEASURING CELL

BACKGROUND OF THE INVENTION

The present invention relates to a radial force measuring cell capable of producing periodic output signals as a function of a periodic displacement of said force about said cell, said measuring cell comprising at least a set of transducers responding to the constraints produced by said force upon said cell, said transducers being arranged symetrically within two planes enclosing a determined angle between themselves.

It is necessary in many cases of the practice to be able to measure with a certain accuracy a force acting radially upon an axle. Such a need arises e.g. during the surveillance of technical installations, operating machines, hoisting appliances, etc. When it is necessary to determine e.g. the tractive force into a cable passing on a pulley it would be very convenient to utilize the axle of the pulley as a force measuring axle or cell.

In practice, the force to be measured may act at an angle constant or variable with respect to a determined direction which is generally choosen as the one of the greatest sensivity and designated by "direction of the load". It is therefore necessary that the measuring cell be not only capable of determining the force independently of its angle of incidence, but also the variable component of the force in the direction of the load.

The U.S. Pat. No. 3,695,096 describes a measuring cell of tubular configuration with a circular cross-section in the interior of which are arranged pairs of strain gauges in two perpendicular planes, these planes being tilted with respect to the axis of the cell at an angle of 45°. The cell comprises at its outer surface, toward its extremities, regions of concentration of force having a reduced diameter and the strain gauges are mounted in the plane of these regions. The strain gauges respond to the constraints of shear. The cell is capable of measuring a force acting radially independently from the angle of incidence of this force, as well as the components of this force according to two directions of the load or directions of reference perpendicular between themselves.

From the U.S. Pat. No. 3,365,689 a resilient disc is known to be utilized for the same purpose as the preceding device and to comprise four radially extended drillings in which the transducers are disposed.

The published application DE-OS No. 25 18 548 describes also a measuring cell of tubular configuration with a circular cross-section in which the transducers (strain gauges) are disposed on plane surfaces provided on the outer mantle of the cell.

However, it is significant that none of the cells known from the prior art is available on the market as an independent measuring device. Tests effected with a measuring cell having a configuration similar to the one described in U.S. Pat. No. 3,695,096 have clearly shown that this cell is not utilizable either for the measurement of the component of the radial force with respect to a direction of the load, nor for the measurement of the same force independently of its angle of incidence. This is because strong errors occur in the measurement which are inherent in the principle itself of the utilization of the cell. The results of the measurements are summarized in FIGS. 1 and 2. FIG. 1 shows the components $P \cos \phi$ (A) and $P \sin \phi$ (B) of a force P acting radially on the measuring cell, these components being measured by two measuring bridges comprising transducers disposed within two perpendicular planes, the individual transducers being connected in the respective bridges in such a way as to eliminate the components of shear so that only the components of flexion are measured.

It is clearly visible that the components which are measured as a function of the angle of rotation $\phi$ present relatively important variations which are unacceptable in practice with respect to the theoretical sinusoidal desired values A' and B'. These differences may be explained by the fact that the measuring cell which rests freely at each of its extremities on a support is loaded in its middle by the radia force P to be measured. This arrangement gives rise to an irregular distribution of the forces in the various sections of the cell which produces a flattening of the top of the sinusoidal function. A Fourier analysis shows the presence of odd harmonies (3rd, 5th, etc).

FIG. 2 shows the curve of errors (errors in %) obtained during the measurement of the value of the force P. In principle, the value of the measured force P should be independent from the angle of rotation $\phi$. However, it appears clearly that this is not the case; the errors of measurement being comprised between +21.5% and −6.5% as a function of the angle of rotation. FIG. 2 shows further that the curve of error has a period of 120° corresponding to the presence of a third harmonic as mentioned above. This renders the cell entirely unsuitable for a practical utilization. The present invention seeks to avoid such errors of measurement in order to render the measurement of the value of the force P practically independent from the angle of rotation, that is with an error acceptable for the practical needs.

From the mentioned prior art and from the results of the measurements indicated above, it is the object of the present invention to realize a measuring cell of tubular configuration for reproductively measuring without any significant error (a) the component of a radially acting force with respect to a determined direction of reference as a function of the angle of rotation of said force and (b) the absolute value of the force independently of the angle of incidence of said force.

SUMMARY OF THE INVENTION

To solve this problem the measuring cell according to the invention is characterized in that at least part of said transducers are connected into a circuit capable of suppressing components of its output signal having periods shorter than the fundamental period of said displacement.

The invention will be described further by way of example with the help of the accompanying drawings.

BRIEF DESCRIPTION OF THE DRAWINGS

FIG. 4 shows the force and the angle of incidence of the force on the measuring cell, FIG. 5 shows the load conditions of a tubular measuring cell, FIG. 6 shows a phenomenological model of the measuring cell, FIG. 7 shows the conditions within a beam submitted to pure flexion, FIG. 8 shows the geometrical quantities associated with the beam of FIG. 7, FIG. 9 shows the component of flexion in the case of a tubular shaped measuring cell, FIG. 10 shows the component of flexion in the case of a measuring cell with a circular cross-section, FIG. 11 shows a measuring cell in which the arrangement of the transducers enables the elimination of a third harmonic, FIG. 12 shows the distribution of the transducers of FIG. 11 within two planes tilted with respect to each other, FIG. 13 shows the connection of the transducers of FIG. 11, FIG. 21 shows the arrangement of the transducers within the measuring cell permitting the measurement of the constraints of flexion and shear, FIG. 23 shows the connection into a bridge of the transducers of FIG. 21 permitting the elimination of the effects of the component of shear in the measurement of the constraint of flexion, FIG. 24 shows the connection into a bridge of the transducers of FIG. 21 permitting the elmination of the effects of the component of flexion in the measurement of the component of shear, FIG. 25 shows the arrangement of the transducers within a beam fixed on one side for the measurement of the value of the radial force.

In the following, a distinction will be made between the measurement of the radial force using the constraints of flexion and of shear, the latter being preferably utilized in the case where the measuring cell overhangs, being fixed on one side only.

It is also important that the measuring cell is of solid construction for being capable of supporting strong constraints when practically utilized and that its configuration permits as far as possible the mounting of the cell into already existing structures without requiring important modifications of the latter. A preferred configuration is a hollow axle at the interior of which the transducers (strain gauges) are mounted in order to be practically ideally protected against the outer mechanical influences. The interior of the cell may also be tightly closed in order to be protected against the outside which permits the cell to support unfavorable environmental conditions.

The transducers are preferably strain gauges (DMS) glued to the inner surface of the tubular cell. It is also known that strain gauges deliver voltages changing linearly as a function of their elongation.

Figure 3:
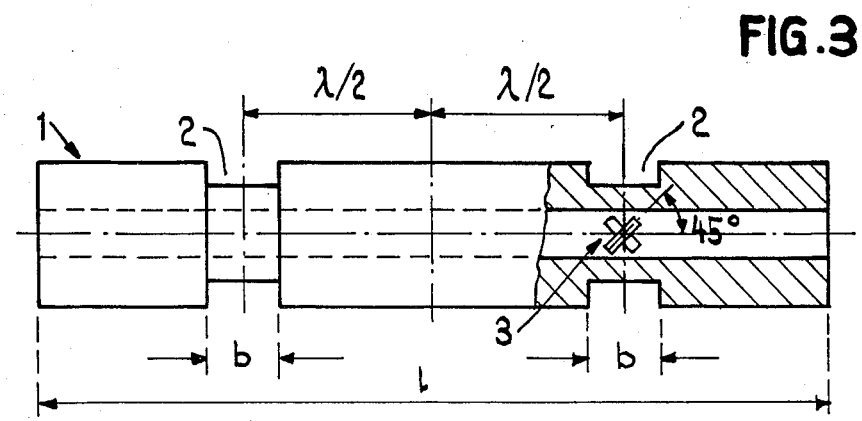
FIG. 3 represents schematically a measuring cell according to the invention.

FIG. 3 shows a measuring cell according to the invention having a tubular configuration and a circular cross-section. This cell has a configuration similar to the one of the cell described in U.S. Pat. No. 3,695,096. The cell 1 has the configuration of a hollow cylinder of length 1 comprising two regions 2 of concentration of the force having a width b and symmetrically distributed at distances $\lambda/2$ with respect to the centre of the cell. These regions of concentration of force are simply grooves provided in the mass of the cell such that the cell has a smaller diameter in the regions of concentration of force than at the outer regions of the cell. In the inner part of the cell are disposed strain gauges 3 in the region corresponding to the grooves. In many known models of measuring cells the DMS are disposed under an angle of 45° with respect to the longitudinal axis of the cell.

FIG. 4 shows the force P and the angle of incidence of this force on the cell. The direction of the load 4 is along the Y-axis and the measurement of the components Px and Py of the force by means of two independent systems of transducers permits the determination of the force P acting radially on the cell independently of the angle of incidence in accordance with the relation $$P = \sqrt{P_x^2 + P_y^2} \ .$$

Let us now examine what happens in the measuring cell with the help of an approximate theory in which the effects of the forces of flexion and of shear are separately examined.

FIG. 5 shows the conditions of loading of a measuring cell of tubular configuration. The cell is disposed between two supports 6 and 7 and the force P is applied between the supports by means of a weight or mass 8.

Due to the fact that a precise and rigorous calculation with the classical theory of elasticity is very sophisticated and difficult to carry out and that this theory is nevertheless not capable of taking into account all of the technical data the study will be made in a simpler form from a phenomenological model like the one of FIG. 6. In this model the measuring cell 9 is fixed on one side only in a stationary support 10. The assumption is made that the force P acts at the center of gravity of the cross-section of the cell and that the distribution of the force in the cross-section of the cell is uniform.

To begin with, let us consider which are the real conditions of the distribution of the force in the cross-section of the cell. In accordance with FIG. 5 the cell may be mounted to be capable of freely rotating in its supports or, on the contrary, th cell may be fixed in place. This shows that the type of mounting is an important factor which can be taken into consideration in the theory only for boundary cases. The influence of the type of fixation of the cell may be determined only experimentally.

As well, the force P is applied between the supports along a line of determined length. It is therefore not possible to define concretely a point or a region of incidence of the force. This is a second factor of insecurity in the theory and the influence of this factor may be determined only experimentally.

From the preceding it results that the force cannot be uniformly distributed in the cross-section of the cell and that an elliptic deformation of the section takes place under load condition, this deformation being variable along the longitudinal axis of the cell.

Let us now examine the case of pure flexion in accordance with FIG. 7. In this figure a beam 11 of circular cross-section is decomposed in superposed layers 1-4 and 1'-4'. Under the influence of a constraint of flexion these layers are displaced with respect to each other (like a leaf spring) which produces a force of shear in the Z-direction. The neutral layer only is submitted to pure flexion while the other layers are submitted to constraints of flexion and elongation, the elongation being produced by the force of shear.

When the beam is not loaded one may define at the surface of the beam a distance $\overline{AB}$ which under load condition is displaced in position $\overline{A'B'}$. With regard to the working of the DMS it is interesting to know the variation of length of this distance. The distance $\overline{AB}$ is identified to the length l (assumed to be a straight line) of a strain gauge as indicated in FIG. 8. In FIG. 8, 12 represents the lateral surface of the beam 11. The other parameters indicated in FIG. 8 are the following:

r: radius of the beam
λ: distance of point A from the origin
ΔZ: projection of l (DMS) on a line parallel with the Z-axis
φ: angle between the radius of point A and the X-axis
S: arc (assumed to be a straight line) produced by
γ: angle of tilting of the DMS with respect to the Z-axis
l: length (assumed to be a straight line) of the unloaded DMS.

From FIG. 8 one can calculate that the length $l_B$ of the DMS under load condition is given by the relation $$l_B = l + \epsilon_m \cdot \qquad (1)$$

$$\cos\gamma \sqrt{(\lambda + l\cos\gamma)^2 + \lambda^2 - 2(\lambda + l\cos\gamma)\lambda \cdot \cos\left(\frac{l}{r}\sin\gamma\right)}$$

$$\sin\left[\phi + \arctg \frac{(\lambda + l\cos\gamma)\sin\left(\frac{l}{r}\sin\gamma\right)}{(\lambda + l\cos\gamma)\cos\left(\frac{l}{r}\sin\gamma\right) - \lambda}\right]$$

with $\epsilon_m$: maximum elongation of the surface layer of the beam.

In the case where the DMS is disposed axially, that parallel with the Z-axis, γ=0 and:

$$l_{B(\gamma=0)} = l(1 + \epsilon_m \cdot \sin\phi) \qquad (2)$$

It should be mentioned here that in practice the angle of rotation φ of the radial force about the cell is in most cases limited to a value much smaller than 360°. However, the theoretical and practical considerations of the present description are valid for any angle of rotation.

In the case where the DMS is disposed radially, γ=90° so that $l_B = 0$ which could have been foreseen in accordance with the theory of pure flexion.

Let us now examine the conditions for the measurement of the component of flexion. A mathmetical treatment based on the theory of elasticity shows that the component of flexion does not behave like a pure sinusoid but that it contains a third harmonic the effect of which is particularly noticeable when the measuring cell is of tubular shape. FIG. 9 shows the curve A of the component of flexion measured with DMS disposed axially inside of a measuring cell of tubular configuration having a circular cross-section. The flattening due to the third harmonic is clearly shown by comparison with the desired curve A'. FIG. 10 shows the curve A of the component of flexion measured with DMS disposed axially at the surface of a measuring cell of circular cross-section. The sinusoidal behaviour of the signal of flexion may be considered as good.

According to an embodiment of the invention the third harmonic may be suppressed by an arrangement of the transducers like the one shown in FIGS. 11 and 12. FIG. 12 shows that the pairs $R_1$, $R_2$ and $R_3$, $R_4$ of transducers, disposed axially respectively in the regions 13 and 14 (FIG. 11) of concentration of force of the cell are arranged within two planes 15 and 16 enclosing between themselselves an angle θ. FIG. 13 shows the connection in a bridge of the transducers $R_1$ to $R_4$.

The ratio of the output voltage e to the supply voltage E of such a bridge is given by the relation:

$$\frac{e}{E} = \frac{R_2R_3 - R_1R_4}{(R_1 + R_2)(R_3 + R_4)} \qquad (3)$$

Assuming that the strain gauges have equal sensitivity one can show that the above relation becomes:

$$\frac{e}{E} = 0,5\ [a\ [\cos\phi(1 + \cos\theta) - \sin\phi\sin\theta] + c\sin 3\phi(1 + \cos 3\theta)], \qquad (4)$$

where a and c are constants depending on the mechanical construction and on the sensitivity of the strain gauges respectively for the fundamental and the third harmonic of the component of the force when the latter is making a complete rotation of 360° about the measuring cell. φ is the angle of rotation.

The above relation (4) shows clearly that the third harmonic may be eliminated if the angle θ between the planes 15 and 16 of FIG. 12 has a value of 60° since cos (3×60°)=−1.

Figure 14:
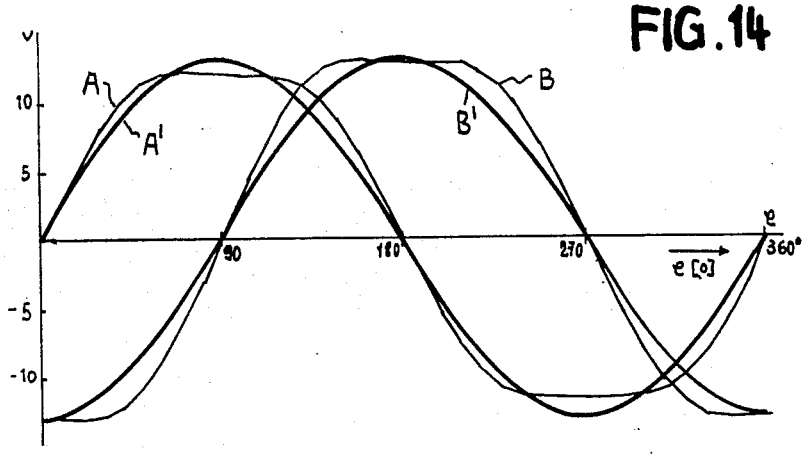
FIG. 14 shows the output signal of a measuring cell without compensation of the third harmonic.
Figure 15:
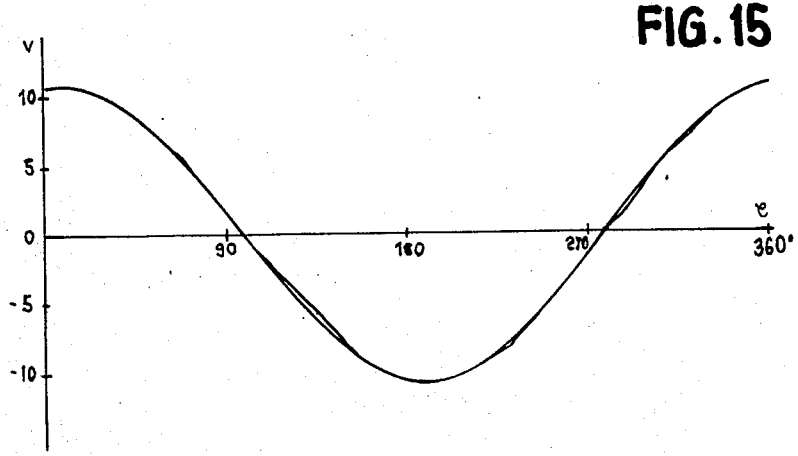
FIG. 15 shows the output signal of a measuring cell with compensation of the third harmonic.

The success of this measure is proved experimentally by a comparison of the curves of FIGS. 14 and 15 which show respectively the output signal (representing the component of the force) of a measuring cell with and without compensation. While the curves A and B of FIG. 14 present (with respect of the desired curves A' and B') a strong distortion due to the presence of the third harmonic the curve of FIG. 15 is practically sinusoidal.

Figure 1:
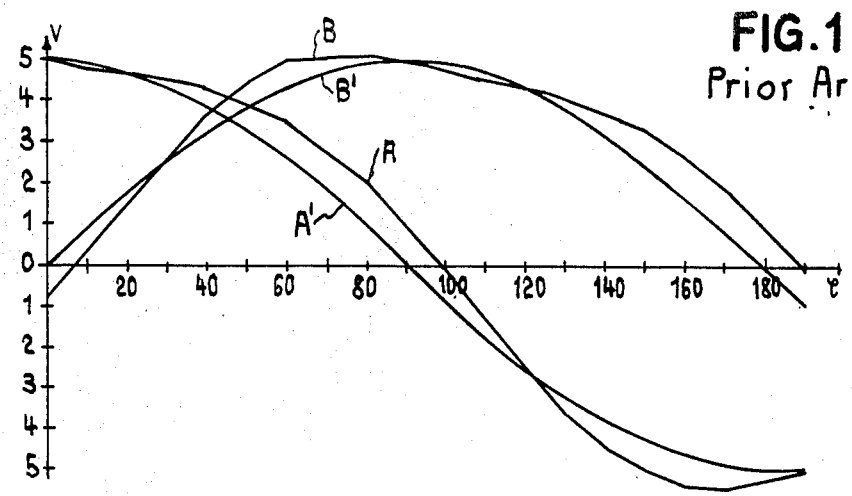
FIG. 1 shows the components of a force acting radially on a known measuring cell.
Figure 2:
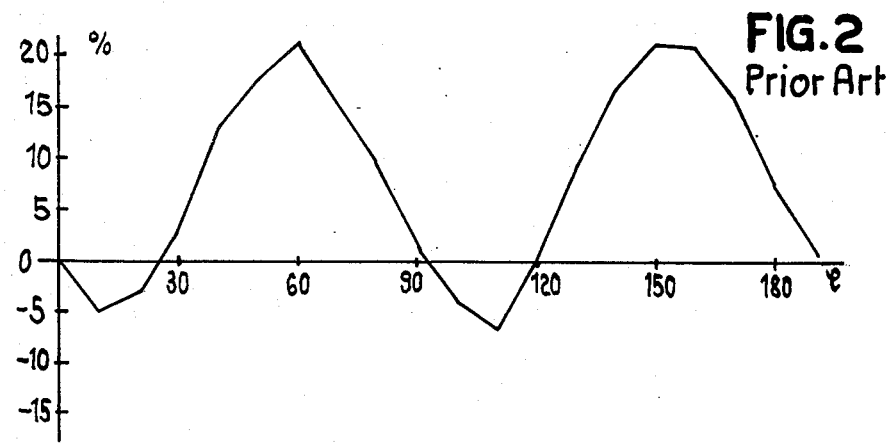
FIG. 2 shows the errors of the value of a force acting radially as measured by a known measuring cell.
Figure 16:
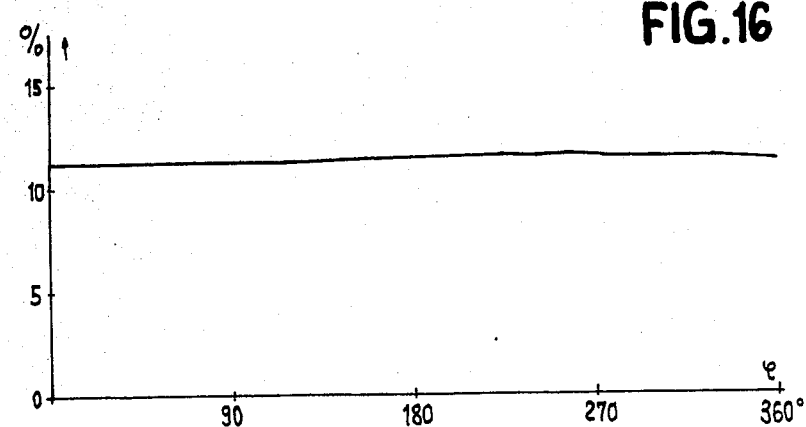
FIG. 16 shows the curve of error of the value of a force acting radially on the measuring cell measuring the constraints of flexion.

In the case of the measurement of the value of the radial force independently from the angle of incidence of this force FIG. 16 shows that the error of measurement (±1.75%) is practically negligible, while without compensation of the third harmonic this error indicated in FIG. 2 is absolutely unacceptable as already mentioned previously.

Figure 17:
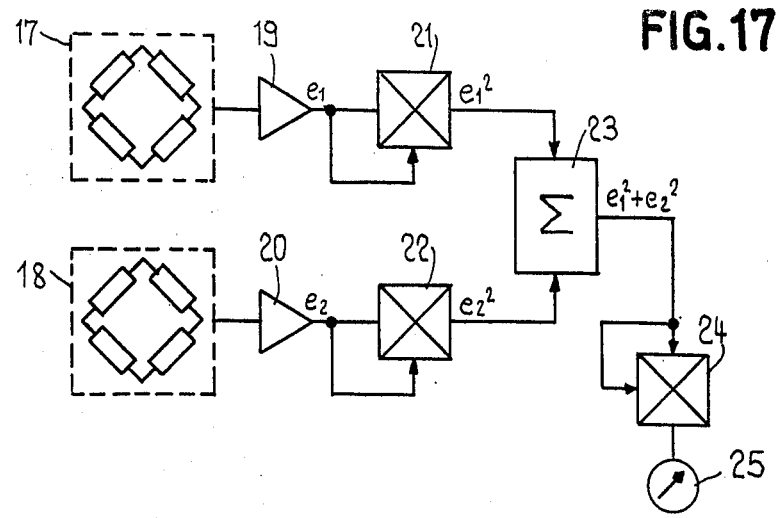
FIG. 17 shows the diagram of a circuit measuring the force acting radially on the measuring cell measuring the constraints of flexion.

The value of the radial force acting on the cell can be measured independently of the angle of incidence through the utilization of the constraints of flexion by the circuit of FIG. 17. In this case there are provided two independent systems of transducers shifted with respect to each other of 90°. The measuring systems 17 and 18, each comprising four strain gauges arranged as indicated in FIG. 11 and connected as indicated in FIG. 13, are connected to a first (19) and a second (20) amplifier delivering respectively the output signals $e_1$ and $e_2$. An operation of squaring is effected by the circuits 21 and 22 upon each of the said output signals and the sum of their squares is effected by a summator 23 followed by a circuit 24 effecting the square root of the sum delivered by the summator and controlling a display device 25 indicating the value of the radial force P independently from its angle of incidence $\phi$.

Let us now examine the effects of the constraints of shear. It has been shown previously that in the case of the beam according to FIG. 7 the beam is not only submitted to constraints of flexion but also to constraints of shear.

Figure 18:
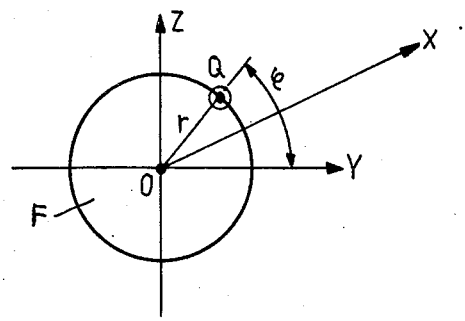
FIG. 18 shows the conditions into a beam in the case of pure shear constraints.

FIG. 18 shows the conditions on a beam in the case of pure constraints of shear. As in the case of FIG. 7 the beam has a circular cross-section of radius r. F is the surface of the section of the beam and Q the shear force acting along a line parallel with the longitudinal X-axis of the beam and situated within a plane making an angle $\phi$ with respect to the Y-axis. It is known that at the border of the section the shear forces are directed along the periphery of the section and that they are null in a perpendicular direction thereof. From FIG. 18 one calculates that the constraint of shear is given by the relation:

$$\tau_s = \frac{8}{3}\frac{Q}{F}(1 - \cos 2\phi) \tag{5}$$

which shows that if the angle of incidence of the radial force effects a rotation of 360° the signal delivered by the DMS in response to the constraints of shear describes two periods while the sinusoidal signal due to the constraints of flexion describes only one period.

Figure 19:
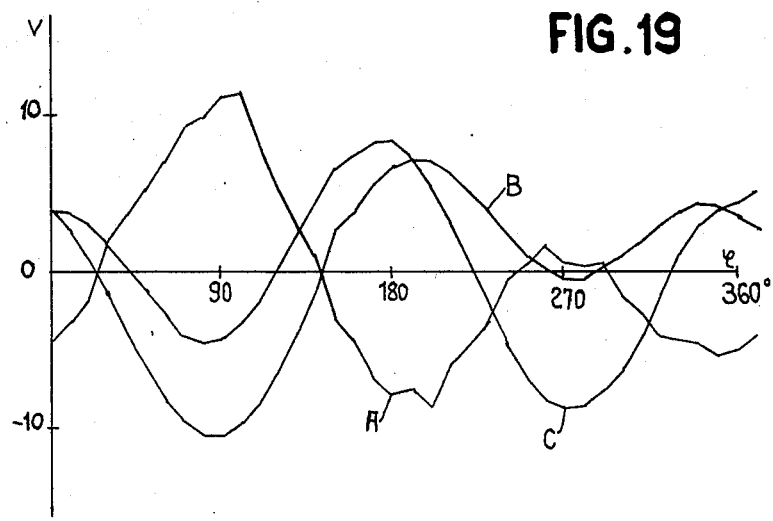
FIG. 19 illustrates the experimental proof of the shear component.
Figure 20:
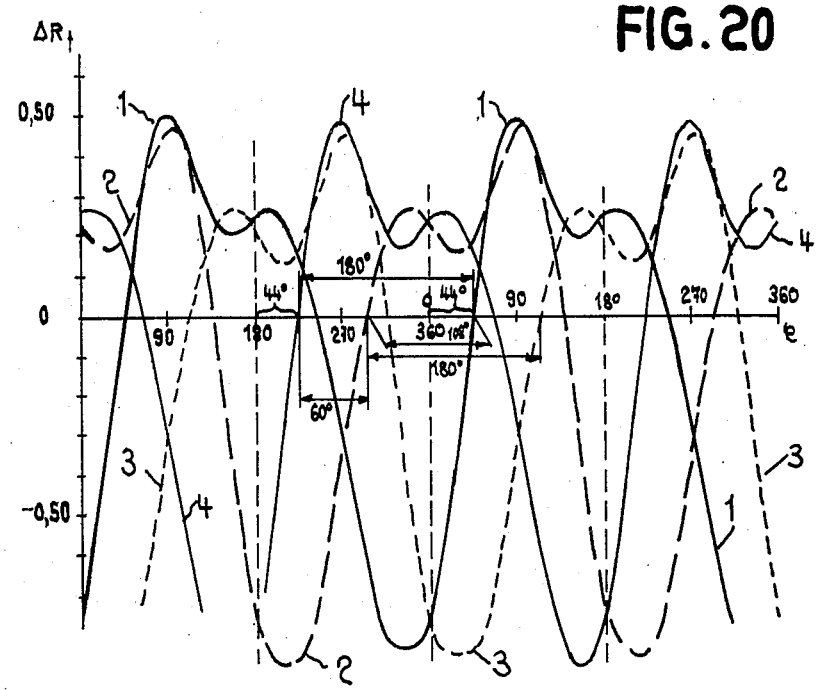
FIG. 20 shows the curves of the variations of the resistance of the transducers of a measuring cell submitted to a radial force.

FIGS. 19 and 20 show the results of the measurements confirming the validity of the preceding theoretical considerations.

FIG. 19 shows three curves A, B and C measured on the same measuring cell according to FIG. 3 fixed on one side only and in which the transducers are glued tangentially, perpendicularly to the longitudinal axis in the inner opening of the cell. The different curves correspond to different values of the applied force and to different initial values of the angle of incidence of this force. It is evident that in conformity with the above relation (5) each curve describes two periods for a single rotation of 360° of the angle of incidence $\phi$ of the force.

Figure 22:
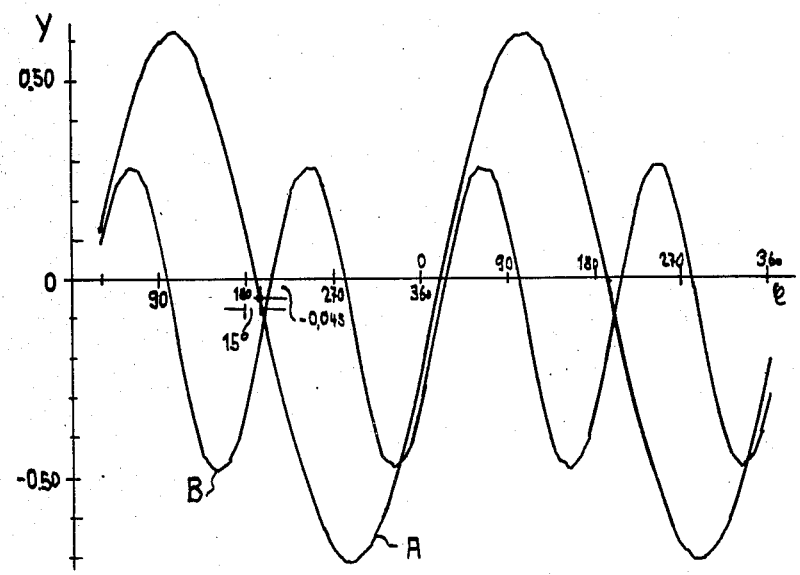
FIG. 22 shows the curves of the component of flexion and of the component of shear obtained by simulation with a computer from the measured variations of the resistance of the transducers.

FIG. 20 shows the curves of the variations of the resistance $\Delta R$ of the four strain gauges 1, 2, 3 and 4 disposed under an angle of 45° with respect to the axis of the measuring cell utilized and represented in FIG. 21. One recognizes clearly the effect of the second harmonic due to the constraints of shear. FIG. 22 shows the components of flexion (A) and of shear (B) obtained by means of a computer from the measured variations of the resistance of the transducers of the cell of FIG. 21. It is clearly evident that for a rotation of 360° of the angle of incidence of the radial force applied to the measuring cell the component of flexion A describes one period only while the component of shear B describes two periods in conformity with the preceding considerations.

FIGS. 23 and 24 show the connections into a bridge of the transducers of FIG. 21 permitting the elimination, respectively, of the effects of the constraint of shear during the measurement of the component of flexion and the effects of the constraint of flexion during the measurement of the component of shear.

It is also possible to utilize the constraints of shear for measuring the value of the force acting radially on the measuring cell independently from the angle of incidence of this force.

FIG. 25 shows the arrangement of the strain gauges A, A', B, B' into a beam fixed on one side for the measurement of the value of the radial force independently from the angle of incidence $\phi$ of this force. The transducers are arranged by pairs A—A' and B—B' in the region of concentration of force within two planes perpendicular to each other. The DMS are arranged tangentially at the surface of the region of concentration and perpendicularly to the longitudinal axis of the beam. One shows that the constraints of shear acting in both perpendicular planes are given by:

For the plane A—A':

$$\tau_{s1} = \frac{k}{2}(1 - \cos 2\phi) \tag{6}$$

For the plane B—B':

$$\tau_{s2} = \frac{k}{2}(1 + \cos 2\phi) \tag{7}$$

where k is a constant of proportionality.

The addition of the signals corresponding to $\tau_{s1}$ and $\tau_{s2}$ gives:

$$e = \tau_{s1} + \tau_{s2} = \frac{k}{2}(1 - \cos 2\phi) + \frac{k}{2}(1 + \cos 2\phi) = k \tag{8}$$

The resulting signal is therefore independent from the angle of incidence $\phi$ of the force acting radially; it is proportional to the value of the radial force acting on the beam.

Figure 26:
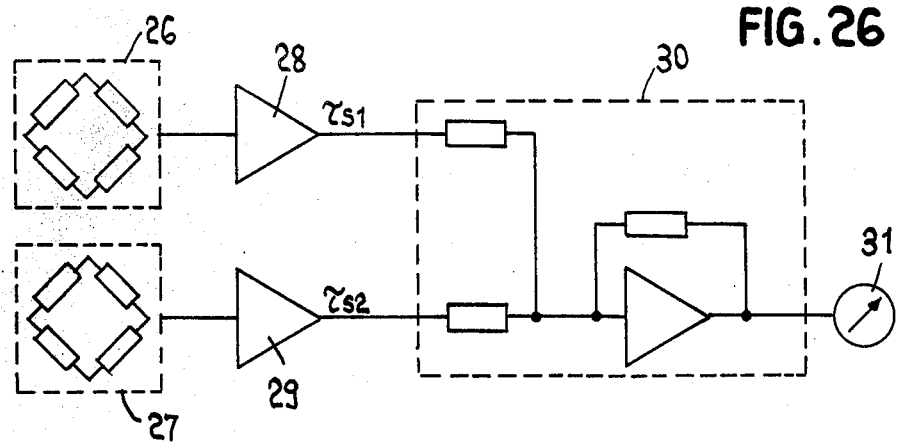
FIG. 26 shows the diagram of the electronic circuit for the measurement of the value of the radial force independently of the angle of incidence of the force.

FIG. 26 shows the electronic circuit permitting the measurement of the value of the force P acting radially independently from the angle of incidence of this force by utilizing the constraints of shear produced in the measuring cell. The DMS A—A' and B—B' are connected with fixed resistances for forming respectively the bridges 26 and 27 the output signals of which, after being amplified in the amplifiers 28 and 29, are connected to the inputs of a summator 30 delivering a signal proportional to the radial force P to a display device 31.

It has been indicated above that the components of the force P acting radially can be measured either by utilizing the constraints of flexion or the constraints of shear. This may be done in two different ways.

1. By a suitable orientation of the strain gauges:
   Axial orientation for the measurement utilizing the constraints of flexion,
   Tangential orientation for the measurement utilizing the constraints of shear.

2. By an orientation tilted of the strain gauges with respect to the axis of the measuring cell and by an adequate connection of these strain gauges in a bridge.

2.1. By arranging the transducers $R_1$–$R_4$ as indicated in FIG. 11 but with a certain angle with respect to the longitudinal axis of the cell instead of the axial arrangement represented, the effect of the component of shear will be felt by the apparition of a second harmonic in the curves of the variations of the resistances of the transducers as indicated in FIG. 20. However, when connecting the transducers according to the configuration of FIG. 13 it is possible to calculate that the output signal of the bridge corresponds to the relation 4 shown above in which the third harmonic is eliminated when choosing $\theta=60°$. This shows that the cell of FIG. 11 with the indicated arrangement of the transducers therein and the bridge connection of these transducers according to FIG. 13 permits to measure the component of the radial force P as a function of the angle of rotation $\phi$ without any disturbing effects produced by the constraints of shear (2nd harmonic) and by the third harmonic appearing during the measurement of this component of the force P when utilizing the constraints of flexion. The measurement of the component of the force P as indicated above constitutes therefore a particularly interesting solution to the problem to be solved by the present invention.

Figure 27A:
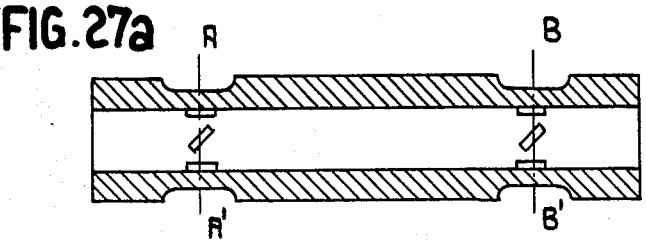
FIGS. 27a, 27b and 27c show a measuring cell having an arrangement of the transducers permitting the elimination of the component resulting from the constraints of flexion.
Figure 27B:
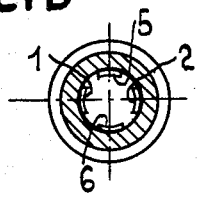
Figure 27C:
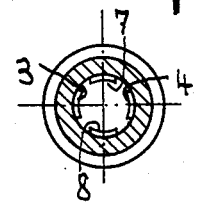
Figure 28:
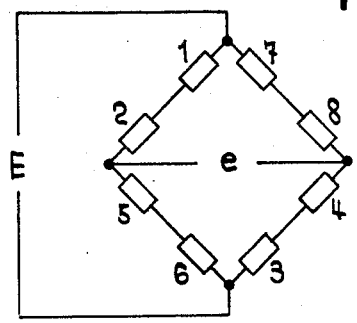
FIG. 28 shows the connection into a bridge of the transducers of FIG. 27.

2.2 By elimination of the effects produced by the constraints of flexion through the utilization of two systems of four transducers each arranged in the regions of concentration of force, the four transducers of each system being disposed within two perpendicular planes as shown in FIGS. 27a, 27b and 27c. FIG. 28 shows the connection into a bridge of the transducers of FIG. 27. It is to be seen that the pairs of transducers situated within a same plane are connected in series and that these pairs form the opposite arms of the measuring bridge. One calculates that the opposite arms of the bridge contains only components which are function of the second harmonic, hence independent of the constraints of shear as indicated by the following relations:

$$R_{(1+2)} = R_{(3+4)} = 2R(1 + b \sin 2\phi) \quad (9)$$

and $$R_{(5+6)} = R_{(7+8)} = 2R(1 - b \sin 2\phi) \quad (10)$$

Utilizing the circuit of FIG. 17 it is then possible to measure by the constraints of shear the value of the force acting radially independently of the angle of incidence of this force.

Summarizing, the present invention contributes to greatly improve the measuring cells of forces acting radially which permits to these cells to be utilized for measurements which are perfectly reproducible and have an accuracy largely sufficient for the requirements of the practice. These improvements are the following:

(1) Elimination of the effects of the constraints of shear by an adequate connection of the strain gauges or by an axial orientation of these strain gauges.

(2) Elimination of the third harmonic when the measurement is effected utilizing the constraints of flexion by the arrangement of the strain gauges within two planes enclosing between themselves an angle of 60°.

(3) Possibility of measuring the value of the force acting radially independently of the angle of incidence of this force by (a) tangential orientation of the strain gauges and utilization of the measuring circuit according to FIG. 26, and (b) by the measures indicated above in relation with FIGS. 27 and 28 and the circuit of FIG. 17 (elimination of the effects of the constraints of flexion).

In relation with the utilization of the constraints of shear it is strongly emphasized at this place that in contradiction with the disclosure of the prior art these constraints do not permit the measurement of the components of the radial force as a function of the angle of rotation $\phi$ by the fact that they produce an output signal describing two periods during the fundamental period of 360° of the angle $\phi$.

I claim:

1. A radial force measuring cell comprising transducers responding to constraints of flexion produced by a radial force acting on the cell, said transducers delivering signals corresponding to the components of the radial force to which they are subjected and being arranged in a first and a second pair of transducers, the transducers of said first pair lying in a first plane passing through a longitudinal axis of said cell and being symmetrically disposed within said first plane with respect to said longitudinal axis of said cell, the transducers of said second pair lying in a second plane passing through said longitudinal axis of said cell and being symetrically disposed within said second plane with respect to said longitudinal axis of said cell, the angle enclosed between said first and second planes being 60°, said transducers being connected into a circuit delivering an output signal representative of the component of the radial force with respect to a given direction as a function of the angle of incidence of the radial force onto said cell.

2. A cell according to claim 1, having a tubular configuration with a circular cross-section, said transducers being mounted on the inner surface of said tube in force concentration regions situated near the ends of said cell and having an outer diameter smaller than the outer diameter of said cell.

3. A cell according to claim 2, wherein said circuit is a bridge circuit, the opposite arms of said bridge circuit comprising respectively a transducer of said first and a transducer of said second pair of transducers, said trahsducer of said first pair and said transducer of said second pair being arranged symetrically with respect to the longitudinal axis of said cell.

4. A cell according to claim 1, wherein said transducers are oriented in a direction parallel with the longitudinal axis of said cell.

5. A cell according to claim 1, wherein said transducers are oriented in a direction making a determined angle with respect to the longitudinal axis of said cell.

6. A radial force measuring cell comprising transducers responding to constraints of flexion produced by a radial force acting onto the cell, said transducers delivering signals corresponding to the components of the radial force to which they are subjected and being arranged in a first and a second system, each of said first and second systems comprising a first and a second pair of transducers, the transducers of said first pair lying in a first plane running through a longitudinal axis of said cell and being symmetrically disposed in said first plane with respect to said longitudinal axis of said cell, and the transducers of said second pair lying in a second plane running through said longitudinal axis of said cell and being symetrically disposed in said second plane with respect to said longitudinal axis of the cell, the angle enclosed between said plane of the first and said plane of the second pair of transducers being 60°, the respective planes of the first system and of the second system being arranged 90° apart, the transducers of the first system and of the second system being respectively connected into a first and a second bridge circuit, each bridge circuit delivering an output signal representing respectively one of the components of the radial force with respect to a given direction and with the direction perpendicular thereof, said output signals being connected to a computing circuit delivering an output signal representative of the value of said radial force independently of the angle of incidence of said radial force onto the cell.

7. A cell according to claim 6, having a tubular configuration with a circular cross-section, said transducers being mounted on the inner surface of said tube in force concentration regions situated near the ends of said cell and having an outer diameter smaller than the outer diameter of said cell.

8. A cell according to claim 6, wherein the opposite arms of said first and second bridge circuits comprise respectively a transducer of said first pair and a transducer of said second pair of transducers, said transducer of said first pair and said transducer of said second pair being arranged symetrically with respect to said longitudinal axis of said cell.

9. A cell according to claim 6, wherein said transducers are oriented in a direction parallel with said longitudinal axis of said cell.

10. A cell according to claim 6, wherein said transducers are oriented in a direction making a determined angle with respect to said longitudinal axis of said cell.

* * * * *